United States Patent [19]
Malcolm

[11] Patent Number: 5,617,566
[45] Date of Patent: Apr. 1, 1997

[54] FILE PORTION LOGGING AND ARCHING BY MEANS OF AN AUXILARY DATABASE

[75] Inventor: Peter B. Malcolm, Lewdown, United Kingdom

[73] Assignee: Cheyenne Advanced Technology Ltd., United Kingdom

[21] Appl. No.: 356,478

[22] Filed: Dec. 15, 1994

Related U.S. Application Data

[63] Continuation-in-part of Ser. No. 165,382, Dec. 10, 1993, abandoned.

[51] Int. Cl.$^6$ ............................................. G06F 17/30
[52] U.S. Cl. .................................... 395/620; 395/460
[58] Field of Search ............................. 395/600, 575, 395/800, 444, 460

[56] References Cited

U.S. PATENT DOCUMENTS

| | | | |
|---|---|---|---|
| 4,507,751 | 3/1985 | Gawlick et al. | 364/900 |
| 4,686,620 | 8/1987 | Ng | 364/200 |
| 5,043,871 | 8/1991 | Nishigaki et al. | 395/600 |
| 5,086,502 | 2/1992 | Malcolm | 395/575 |
| 5,163,148 | 11/1992 | Walls | 395/600 |
| 5,276,860 | 1/1994 | Fortier et al. | 395/182.04 |
| 5,363,473 | 11/1994 | Stolfo et al. | 395/50 |
| 5,426,782 | 6/1995 | Shiga | 395/600 |
| 5,454,099 | 9/1995 | Myers et al. | 395/182.04 |
| 5,455,946 | 10/1995 | Mohan et al. | 395/600 |

FOREIGN PATENT DOCUMENTS

| | | | |
|---|---|---|---|
| 0426189A3 | 5/1991 | European Pat. Off. | G06F 15/401 |
| 0566966 | 10/1993 | European Pat. Off. | G06F 11/14 |
| 2136175 | 12/1984 | United Kingdom | G06F 15/00 |
| WO91/01026 | 1/1991 | WIPO | G06F 15/40 |

OTHER PUBLICATIONS

Albert Alderson, "A space-efficient technique for recording versions of data", *Software Engineering Journal*, Nov. 1988, pp. 240–246.

Badrinath et al., "Synchronizing Transactions on Objects", IEEE Transactions on Computers, vol. 37, No. 5, May, 1988, pp. 541–547.

David Lieberman, "Hierarchical File Server Puts Archives On–Line", Computer Design, vol. 27, No. 21, Nov. 15, 1988, pp. 36–37.

Clematis et al., "Combining Different Granularity of Concurrencyfor Real Time Applications", Proceedings Euromicro Workshop onReal Time, Como Italy, 14–16 Jun. 1989, pp. 11–17.

S. Wang, "Improvement of Concurrency Control Within Object–Oriented Database Systems", Proceedings of the 1990 Symposium onApplied Computing, Fayetteville, Arkansas, 5–6 Apr., 1990, pp. 68–70.

Hisgen et al., "Granularity and Semantic Level of Replication inthe Echo Distributed File System", Proceedings, Workshop on theManagement of Replicated Data, Houston, Texas, 8–9 Nov. 1990, pp. 2–4.

Mecozzi et al., "Design for a Transparent, Distributed File-System", Digest of Papers, Eleventh IEEE Symposium on MassStorage Systems, Monterrey, California, 7–10 Oct. 1991, pp. 77–84.

Thomas W. Nelson, "Memory Caching and Optimized Disk I/O", TECHSpecialist, vol. 2, No. 11, Nov. 1991, pp. 14–28.

Condry et al., "The Object–Oriented Advantage in Prototyping aRemote File System", Proceedingsof the Second InternationalWorkshop on Object–Orientation in Operating Systems, DourdanFrance, 24–25 Sep. 1992, pp. 190–199.

(List continued on next page.)

*Primary Examiner*—Thomas G. Black
*Assistant Examiner*—Paul R. Lintz
*Attorney, Agent, or Firm*—Fish & Richardson P.C.

[57] ABSTRACT

In a hierarchical storage management system, files are automatically archived when they have not been accessed for a specified period. With large database files, the file cannot be archived, even though only a small number of records has been used. In this invention an auxiliary database is maintained indicating which data blocks have been accessed and on what dates. Non-accessed blocks and then be archived and deleted from the disk file to reduce storage requirements.

34 Claims, 5 Drawing Sheets

OTHER PUBLICATIONS

Ludescher et al., "File Storage Management for TFTR PhysicsData", 14th IEEE Symposium on Fusion Engineering, Proceedings, San Diego, California, 30 Sep.–3 Oct. 1991, pp. 856–859.

C. Mohan, "AIRES/LHS: A Concurrency Control and Recovery MethodUsing Write–Ahead Logging for Linear Hashing with Separators", Proceedings, Ninth International Conference on Data Engineering, Vienna, Austria, 19–23 Apr. 1993, pp. 243–252.

Hurwicz et al., "Cache as Cache Can", LAN Magazine, vol. 8, No. 12, Nov., 1993, pp. 209–213.

Marsh et al., "Flash Memory File Caching for Mobile Computers", Proceedings of the Twenty–Seventh Hawaii Internation Conferenceon System Sciences, Wailea, Hawaii, 4–7 Jan., 1994, pp. 451–460.

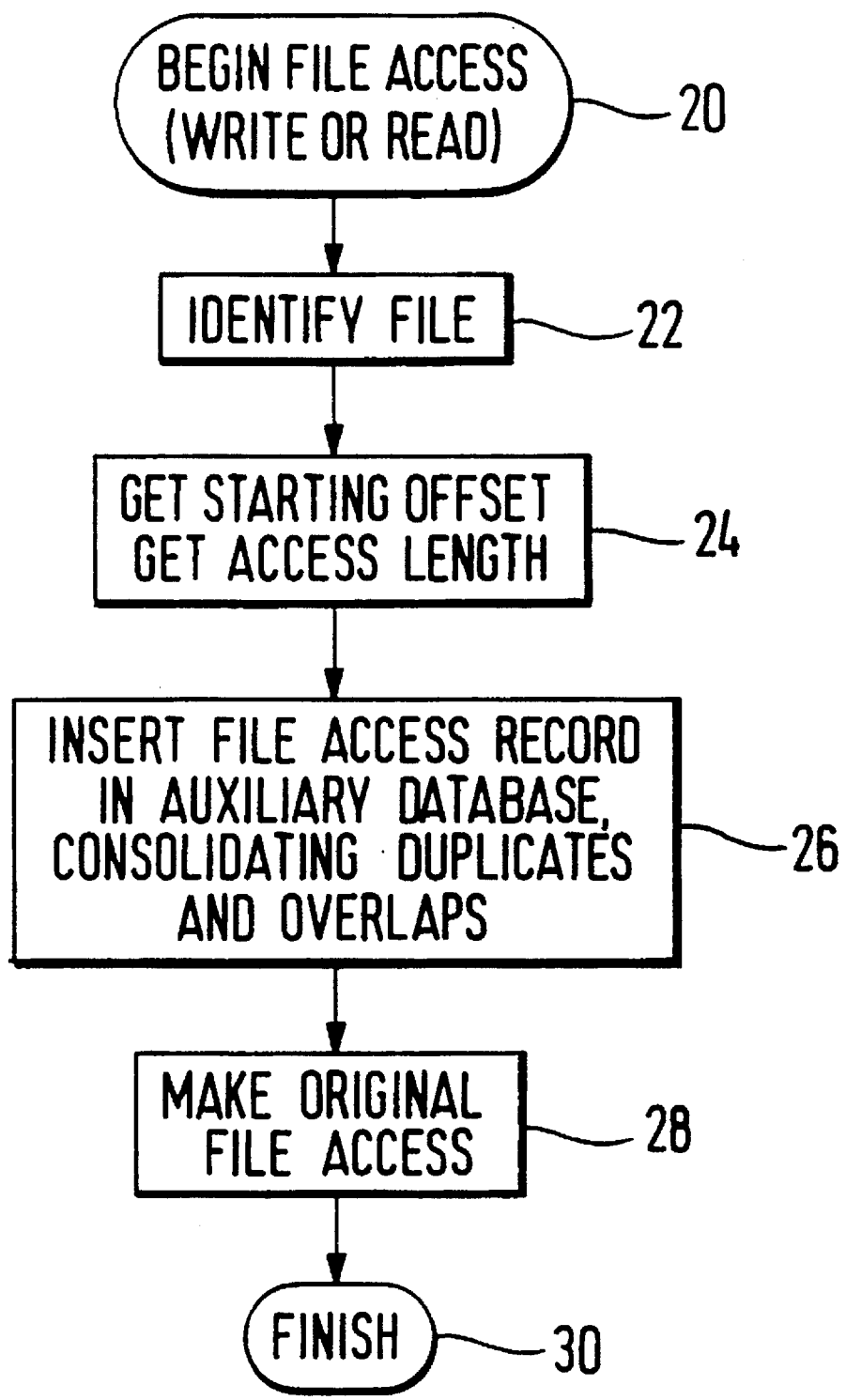

FILE PORTION LOGGING AND ARCHING BY MEANS OF AN AUXILARY DATABASE

CROSS-REFERENCE TO RELATED APPLICATION

This application is a continuation-in-part of the present inventor's U.S. patent application Ser. No. 08/165,382 filed Dec. 10, 1993 entitled Method of Operating a Computer System, now abandoned.

BACKGROUND OF THE INVENTION

The present invention relates to storage of computer data, and more particularly to hierarchical storage management of computer data files.

The volume of data stored on personal computer hard disks, acting as mass storage devices, has increased rapidly over the last decade. This is particularly true of data held on network file servers where hard disk sub-systems of 1 GB (gigabytes) or more, containing many thousands of files, are now commonplace.

Typically, many of the files on a network file server will not have been accessed for some time. This may be for a variety of reasons; the file may be an old version, a backup copy, or may have been kept just in case it might one day be needed. The file may in fact be totally redundant; however only the owner of the file can identify it as such, and consequently the file is kept for backup/security reasons. Good computing practice suggests that if in doubt files should be kept indefinitely. The natural consequence of this is that the hard disk fills up with old files. This happens in virtually every microprocessor based personal computing system from the smallest to the largest.

Hierarchical Storage Management (HSM) is a known technique for resolving this problem. Most operating systems maintain a record of the last date and time a file was updated (ie written to). Many also maintain a record of the last date and time a file was accessed (ie read from). An HSM system periodically scans the list of files on a hard disk, checking the last accessed date/time of each. If a file has not been used for a predetermined amount of time (typically 1 to 6 months) then the file is archived, that is it is transferred to secondary storage, such as tape, and deleted from the hard disk.

HSM is typically integrated with backup. Consider a tape backup system with HSM facilities in which the inactivity threshold is set to three months. The backup process is run periodically (typically at least weekly) and notes that the last accessed date for a given file is more than 3 months ago. The backup system ensures that it has, say, three backup copies of the file on different tapes (or waits until a subsequent occasion when it has three copies) and then deletes the file. Should the file ever be needed, the user simply restores it from one of the three backup tapes. The backup system must ensure that tapes containing the archival copies of the file are not overwritten. This method provides a long-term solution to the problem, since tapes are removable, readily replaced and inexpensive.

Once a file has been deleted by an HSM system it is no longer visible on the original disk. This may be a disadvantage should a user or application later decide that access to the file is required, since no trace of the file will be found on searching the disk. The user or application then has no means of knowing that the file could be restored from a backup, and an application may consequently give anything from misleading information to a fatal error.

Ideally, instead of being removed without trace, the file should continue to be listed in the directory of the disk (preferably with some means of identifying that it has been moved to backup or secondary storage) but without the actual file data being present and taking up disk space. In fact, this facility is provided in many HSM systems and is known as migration. The HSM system typically leaves the file reference in the directory, and either replaces the file data with a small 'stub' containing the identity of the location where the migrated file may be found, or deletes the data completely leaving a file of zero length.

A further enhancement of HSM systems, known as de-migration, causes the HSM system to automatically restore a migrated file to the original disk in the event that a user or application attempts to access it. Obviously, this can only be possible if the secondary storage medium containing the migrated file is continuously connected to the system. Where migrated data is stored on such a 'near-line' device, for example an optical disk 'jukebox', the request to access the file may even be temporarily suspended until the file is restored, whereupon it is allowed to proceed as if the file had never been migrated.

The HSM techniques described above are effective when applied to large numbers of relatively small files used by only one user at a time. However, consider a database system in which multiple users access a single, large database file containing customer names and address records or similar historical data. Since new customer records are constantly being added and records of current customers amended, the file is never a candidate for migration since it must always be available. Nevertheless, such a file will typically have many records for old inactive customers whose details must be kept for possible future reference, but whose records may otherwise be left unaccessed for significant periods of time. The disk space occupied by such inactive records can often represent the majority of space taken up by the entire file.

It is already known to have a random access file, in which small quantities of data can be written to or read from any part of the file at random. When a new random access file is created, the file has zero length until data is written to it. Since the file has random access, the first piece of data written need not necessarily be at offset 0 (ie the beginning of the file), it could be written at any position. For example, 10 bytes of data could be written from offset 1000. The file will then have a logical length of 1010 bytes when only ten bytes have actually been written. Some operating systems deal with this situation by automatically 'filling in' the 'missing' 1000 bytes with null or random characters, thereby allocating 1010 bytes even though only 10 were actually written.

Advanced operating systems, such as those used in Network File Servers, support the concept of sparse files in which disk space is only allocated to those areas of the file to which data has actually been written. Typically, this is achieved by extending the file allocation table (a map of how files are stored on the disk) so that each entry, indicating the next location in which data for a particular file is stored, is accompanied by a value indicating the logical offset at which the data begins. Thus in the above example, the first entry would indicate that data begins at position x on the disk, and that the first byte is at logical offset 1000 in the file (in a 'normal' file the logical offset would be 0). The areas of a sparse file to which data has never been written are known as holes.

The present inventor's U.S. patent application Ser. No. 08/165,382 filed Dec. 10, 1993 and now abandoned, describes a method and system for operating a computer system, which overcomes the problems of backing up very large files. This is achieved by building an auxiliary database which defines the areas of the file that have been modified. When a backup operation takes place, a modification file is formed and backed up which contains the modified areas only of the file. By such a partial file backup system, the size of the backup may be reduced.

SUMMARY OF THE INVENTION

The invention in its various aspects is defined in the independent claims below. Advantageous features of the invention are set forth in the appendant claims.

In the preferred embodiment of the invention, described below with reference to the drawings, an auxiliary database is maintained indicating which data blocks have been accessed, and on what dates. Non-accessed blocks can then be archived and deleted from the disk file to reduce storage requirements. The deletion can be achieved by adjusting the FAT (file allocation table) to treat the file as a sparse file.

If a read request is made for a portion of a file that has been archived, or migrated, then the system de-migrates the required file portion before the read request is satisfied.

However, records that have recently been accessed will already be on the hard disk and can immediately be accessed a subsequent time. Thus records that are frequently required will be readily available without the need to retain the entire file on the hard disk.

The method may be extended by, in effect, increasing the inactivity threshold to the lifetime of the auxiliary database. If only a small number of records are accessed out of a large database file, then all the accessed records could be kept on the hard disk, regardless of the date of last access. The unaccessed records can however be deleted so as to free disk space. In this case, the auxiliary database does not need to contain the date or date/time of the last access. At long intervals, e.g. every month, all the accessed areas can be migrated and the auxiliary database cleared.

The method may be used in conjunction with the partial file storage method of the aforementioned application. The auxiliary database is then required to record additionally whether the accesses to the file were write accesses, in which case data may have been modified, or were only read accesses. The partial file backup method of the aforementioned application did nothing to free space on the hard disk while leaving available those records that were likely to be re-accessed.

BRIEF DESCRIPTION OF THE DRAWINGS

In the drawings:

FIG. 3 is a flow chart illustrating a file access operation in accordance with the invention;

DETAILED DESCRIPTION OF THE PREFERRED EMBODIMENT

Figure 1:
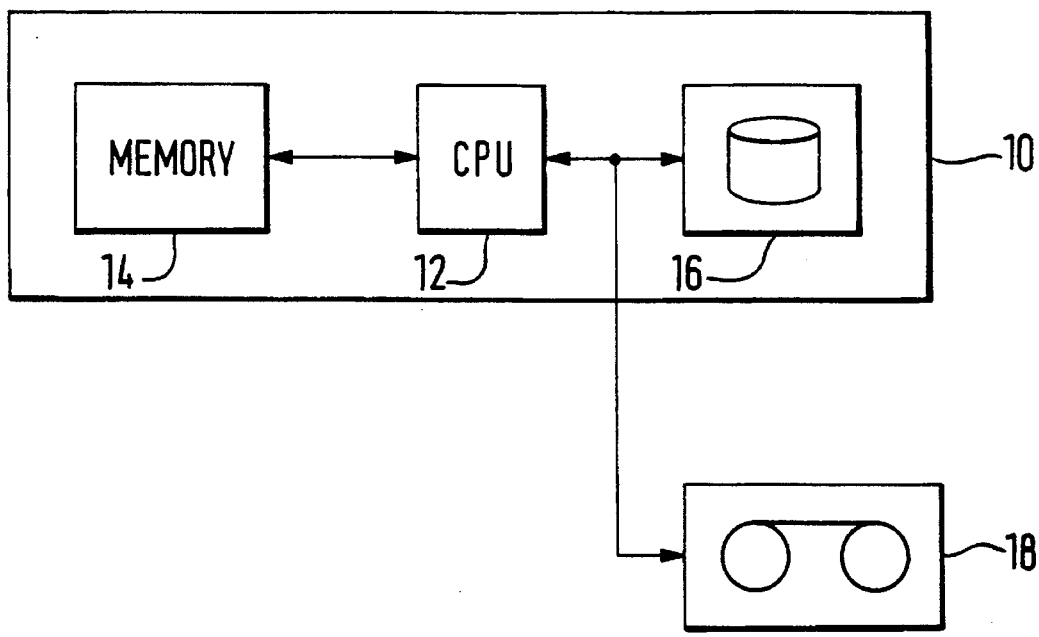
FIG. 1 is a block diagram of a personal computer system with a tape drive.

FIG. 1 of the drawings shows a personal computer (PC) 10 comprising a central processing unit (CPU) 12, a random access memory (RAM) 14, and a mass storage device in the form of a hard disk 16. The personal computer is also provided with a tape unit 18 providing secondary storage for backup and archival purposes.

In use, the random access memory 14 stores instructions which are applied to the central processing unit 12 to control the operation thereof. Some of these instructions come from the operating system direct, and some are initiated by the applications program being run on the computer.

Operating systems generally maintain a file allocation table (FAT) which records the physical location on the hard disk of each block of data. In addition, the operating system records in relation to each file an archive flag which is set when the file is modified and which can be cleared when the file is backed up. Existing backup systems use the archive flag to determine whether a file has been modified and thus needs to be backed up.

A hierarchical storage management system may be employed which automatically backs up to tape any file which has not been accessed for a specified period.

In the preferred embodiment of this invention, an auxiliary database is maintained, which indicates, for each file, which data blocks have been accessed and on what dates, so that the hierarchical storage management system can periodically archive or migrate those blocks that have not been accessed. Those blocks can then be deleted and the storage requirements thereby reduced.

Consider a file initially 125 bytes in length, containing five records each of length 25 bytes, on Jan. 1, 1995, at which point an auxiliary database is opened to intercept requests to access any existing record in, or add a new record to, the file. The requests over a certain period, for example between January 1 and Apr. 10, 1995 might be:

Jan. 21, 1995—New record added, located at offset 125, length 25 bytes.

Feb. 3, 1995—Old record accessed (read), located at offset 25, length 25 bytes.

Feb. 15, 1995—Old record accessed (read), located at offset 75, length 25 bytes.

Apr. 3, 1995—New record added, located at offset 150, length 25 bytes.

When a request is intercepted, the date, the position of the record in the file, and the length of the record are noted in the auxiliary database in the following way:

TABLE 1

| Day No. | Offset | Length |
| --- | --- | --- |
| 34720 | 125 | 25 |
| 34733 | 25 | 25 |
| 34745 | 75 | 25 |
| 34792 | 150 | 25 |

It must of course be possible to identify the particular file required. It is assumed here that a separate auxiliary database is maintained for each file. In practice it may be preferable to maintain a separate auxiliary database for each sub-directory, in which case the file will also need to be identified within the database. This however, reduces the number of auxiliary databases, and thus the number of additional files created. In principle a single auxiliary database could be created for the whole disk.

Figure 2:
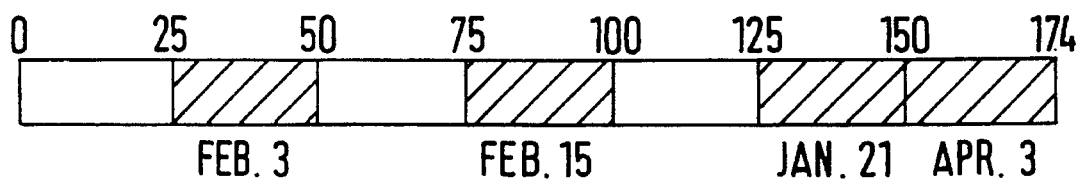
FIG. 2 is a diagram illustrating accesses to a file.

Any file areas not included in the auxiliary database illustrated in Table 1 have not been accessed at all. The day number is simply a counter, representing the days which have elapsed since an arbitrary start date, in this case Jan. 1, 1900. In a more sophisticated system, both date and time (date/time) could be included. FIG. 2 illustrates the file diagrammatically, with shaded areas representing file data that has been read or written, and white areas representing data that has not been accessed.

The steps taken in performing an access are thus as shown in FIG. 3. Step 20 indicates that an access is required. This may be a read access or a write access. The file is first identified, step 22, and the starting offset and access length identified, step 24. In step 26 this data is stored in an auxiliary database, together with the date, as shown above in Table 1. Preferably step 26 includes a consolidation operation that ensures that the auxiliary database does not contain redundant information. For example, subsequent accesses may duplicate or overlap previous accesses. When these steps are completed the originally-desired file access is made, step 28, whereupon the routine is completed, step 30.

These steps are followed for each access, and, therefore, by April 10, the file is 175 bytes in length and contains seven records, while the auxiliary database looks like Table 1 above. Over the monitoring period (seventy nine days) the records which were not accessed at all are obvious candidates for archiving. However, suppose it is decided that all records not accessed within the last sixty days should be archived. The records are sorted by first assuming that the entire file is to be migrated to secondary storage, and then scanning the auxiliary database for all records with a day number of 34739 or greater (34739 being the sixtieth day before April 10 which is day 34799). Any records with a day number meeting this criterion are identified and those parts of the file containing them are marked accordingly so that they are not subject to migration. Any parts of the file left unmarked are thus cleared for migration.

Figure 4:
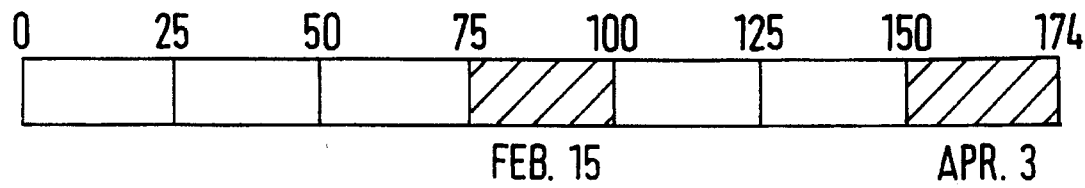
FIG. 4 is a diagram similar to FIG. 2 illustrating file portions that are to be retained on hard disk.

Of the four records accessed between Jan. 1, and Apr. 10, 1995, only the later two, made on Feb. 15 and Apr. 3, 1995 respectively, have a day number of at least 34739. Therefore, only the two most recent records are to be retained, leaving the remainder of the file—those parts defined as bytes 0 to 74 and bytes 100 to 149—for migration. This is illustrated diagrammatically in FIG. 4, in which the records to be retained are shown shaded and the records to be migrated are white. The data areas of the file determined to be for migration are now copied to the secondary storage device using normal HSM procedures. Details of the location and length of each record are maintained by the HSM system to facilitate subsequent retrieval. In addition, the auxiliary database can be edited to remove any trace of the records having a day number less than 34739, thereby preventing unchecked expansion of the size of the auxiliary database.

To gain any advantage from migrating the unused records to the secondary storage device, it is necessary to free the space occupied by those same records on the disk. Effectively, this is achieved by making the file into a sparse file. In other words, the records which have undergone migration are replaced by holes. The disk space formerly taken up by the redundant records is thereby recovered, since the holes do not take up disk space. Assuming that the record with the highest offset value is not archived, the logical length of the file remains unaltered by this operation, but the number of bytes of actual data is reduced, making room for new file data.

The sparse file may be created in the following way. Assume that the system has a file allocation table (FAT) in which disk space is conveniently allocated in blocks of 25 bytes. Therefore, seven blocks will be required to account for the 175 bytes of the file as at Apr. 10, 1995. The file might be allocated in the following way:

TABLE 2

| Entry | Next Block Link | Logical Offset |
|---|---|---|
| Directory | 1 | 0 |
| 1 | 2 | 25 |
| 2 | 3 | 50 |
| 3 | 4 | 75 |
| 4 | 5 | 100 |
| 5 | 6 | 125 |
| 6 | 7 | 150 |
| 7 | −1 | −1 |

Note that the first entry is stored in the directory structure. Each block on the disk has an entry in the table which indicates the block where the next part of the file will be found. For example, the second block has an entry linking it to block 3 where that part of the file with an offset 50 bytes is to be found. The seventh block merely has a negative entry (−1) to indicate that it is the last block containing data for the file. In this example, the file is conveniently stored consecutively in blocks 1 to 7, but in practice the blocks could equally well have been allocated in random order with gaps in between.

The allocation table must be adjusted to free the disk space used by the migrated records, in other words bytes 0 to 74 and bytes 100 to 149 of the file must be deleted. The first area is covered by blocks 1, 2 and 3 and the second by blocks 5 and 6. When the data in these blocks is deleted, the remaining entries for the file are adjusted so that a chain of entries is preserved. The modified file allocation table would therefore be:

TABLE 3

| Entry | Next Block Pointer | Logical Offset |
|---|---|---|
| Directory | 4 | 75 |
| 1 | 0 | 0 |
| 2 | 0 | 0 |
| 3 | 0 | 0 |
| 4 | 7 | 150 |
| 5 | 0 | 0 |
| 6 | 0 | 0 |
| 7 | −1 | −1 |

Blocks 1, 2, 3, 5 and 6 each have a zero entry (0) to indicate that these are now free of data. From the modified file allocation table, the operating system can readily determine that the first allocated block for the file is block 4 which contains data beginning at logical offset 75 and that the next (and last) block of file data is stored in block 7 and contains data beginning at logical offset 150. It should be noted that some operating systems do not store a logical offset for the first allocated block, which, in such systems can not therefore be freed.

The precise manner in which the deletion takes place is not important. What matters is that the space occupied by the migrated blocks is made available on the hard disk, that is to say they are freed for use.

In the example given above, for ease of explanation, the block size and read/write requests have all been assumed to be 25 bytes, and furthermore it has been assumed that the requests all occurred exactly on block boundaries. In practice, the allocated block size is typically a multiple of 512 bytes, and the position and length of read/write requests will vary considerably. Since only whole blocks can be freed (deleted), the system must be implemented such that only data areas representing whole blocks are migrated and freed. Since large files typically occupy many thousands of blocks, this reduction in efficiency is rarely significant.

Figure 5:
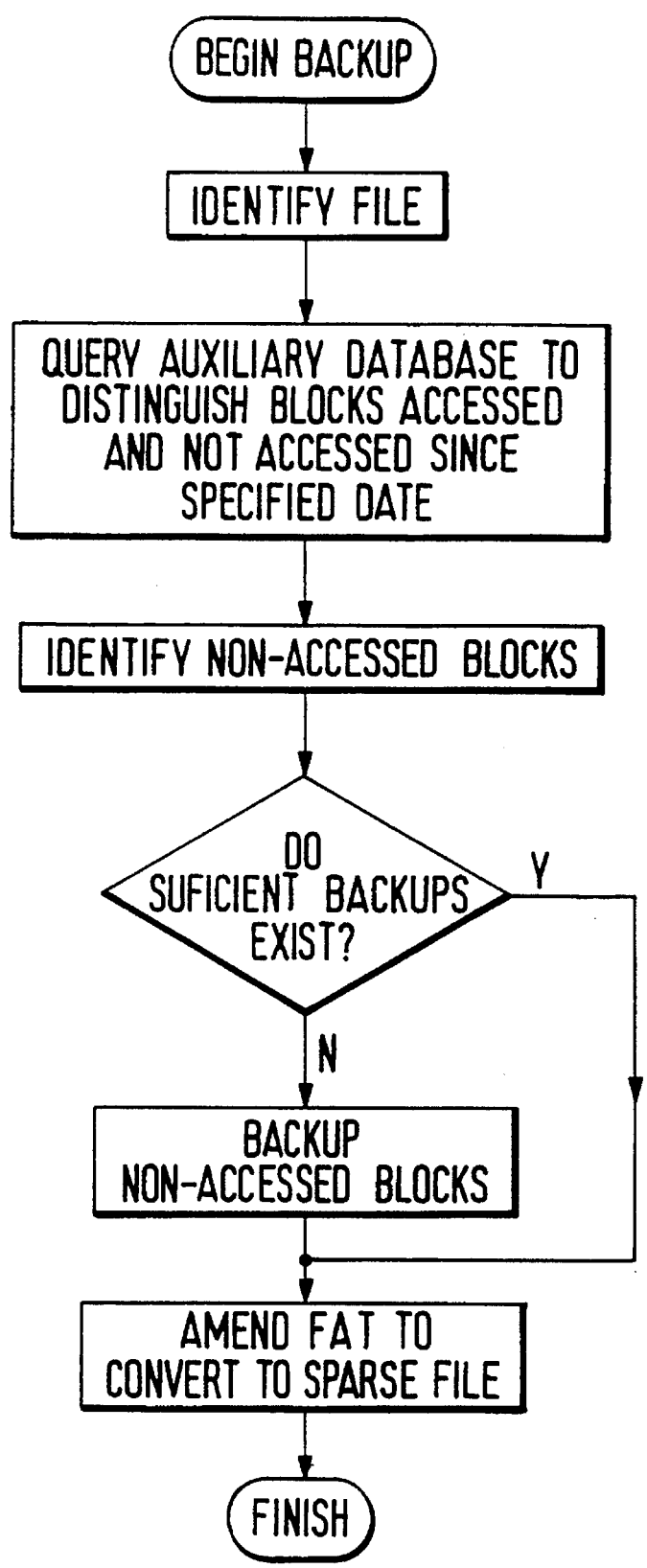
FIG. 5 is a flow chart illustrating a backup operation in accordance with the invention as implemented by the hierarchical storage management system.

The above steps are illustrated in the flow chart of FIG. 5. Step 40 indicates the start of a back-up operation. First the required file is identified, step 42. Then the auxiliary database is interrogated, step 44, to distinguish those blocks that have been accessed since a specified date from those that have not. In step 46, those blocks that have not been accessed since the specified date are identified. Now, in fact it may be that the non-accessed blocks have already been backed up as part of the normal routine backup operation. Typically, they will have been backed up more than once. Therefore there is no need to migrate them, or back them up, again. However it is necessary to migrate to secondary storage those blocks where sufficient backups do not already exist. These can be identified by tagging them. Whether it is the blocks that are to be migrated that are tagged or those that are not is immaterial, so long as they are properly distinguished. In decision step 48, therefore, a determination is made as to whether sufficient (e.g. three) backups already exist. If not, then in step 50 the tagged blocks are backed up or migrated. In step 52 the space occupied by all the non-accessed blocks is released by amending the system file allocation table (FAT) to convert the file into a sparse file. If the file is already a sparse file, then more holes are added. The routine is then completed, step 54.

The final refinement is to intercept subsequent read requests to the file to determine if the request is attempting to read migrated data. If no provision is made to intercept read requests, the operating system could return either null data or report an error if an attempt is made to read a sparse file hole. Having intercepted a request to read migrated data, the appropriate signals can be generated to de-migrate the requested information automatically. If individual read requests are small, the time taken to de-migrate data is short in comparison to de-migrating a whole file, since only the data actually needed will be retrieved.

Figure 6:
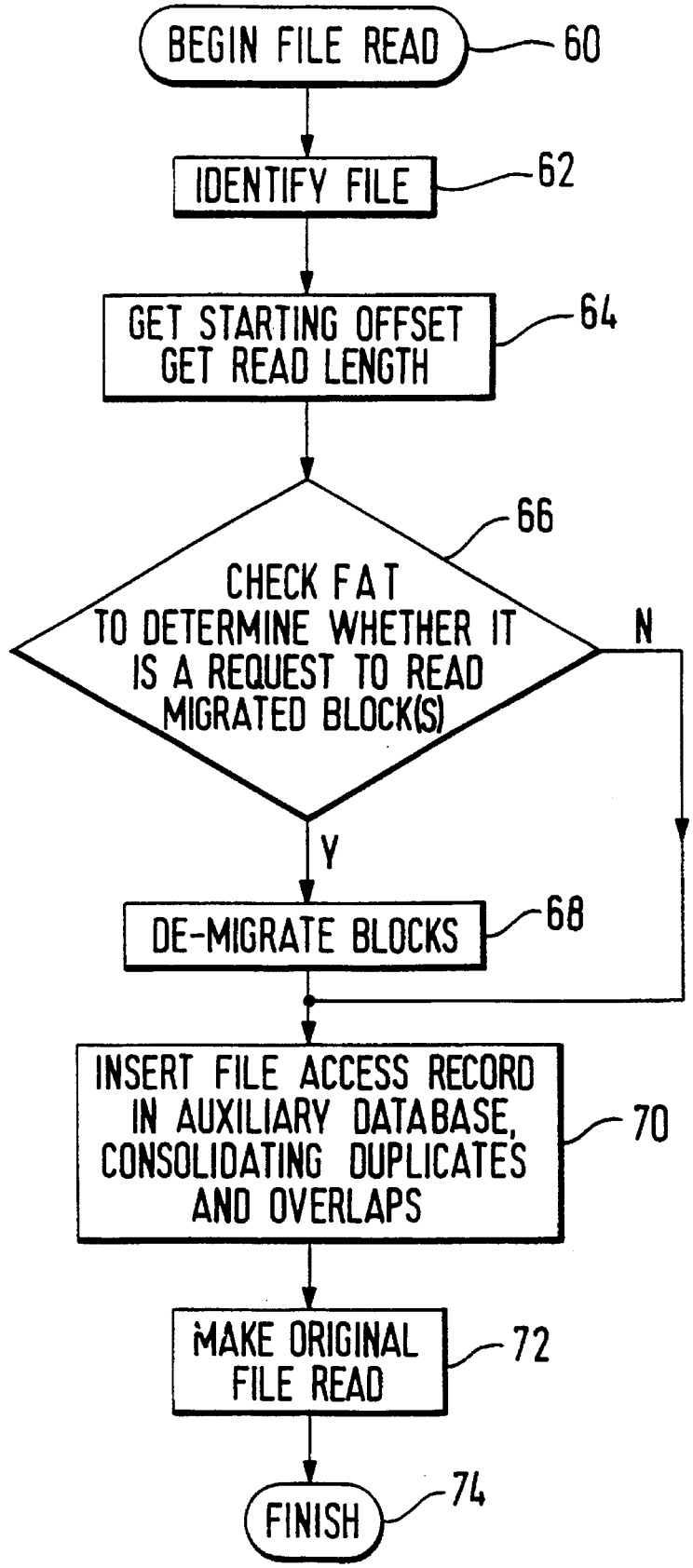
FIG. 6 is a flow chart illustrating a read access operation on a file which has been partially archived.

This operation is illustrated in FIG. 6. Step 60 indicates the start of a file read access. The file is identified, step 62, and the starting offset and read length extracted in step 64, as in FIG. 3. Now the operation passes to decision step 66 which checks the file allocation table (FAT) to determine whether the read request is a request to read data in any block or blocks that have been migrated using the routine of FIG. 5. If the answer to this question is No, then the operation passes to steps 70, 72 and 74 which correspond to steps 26, 28 and 30 respectively in FIG. 3. However if the answer to the question in step 66 is Yes, the required data is first de-migrated in step 68, before the operation passes to steps 70, 72 and 74, as before. It is not necessary to de-migrate the whole block, and in general just the records or records that are required will be de-migrated. These may fall within one block or extend across two or more blocks.

Figure 7:
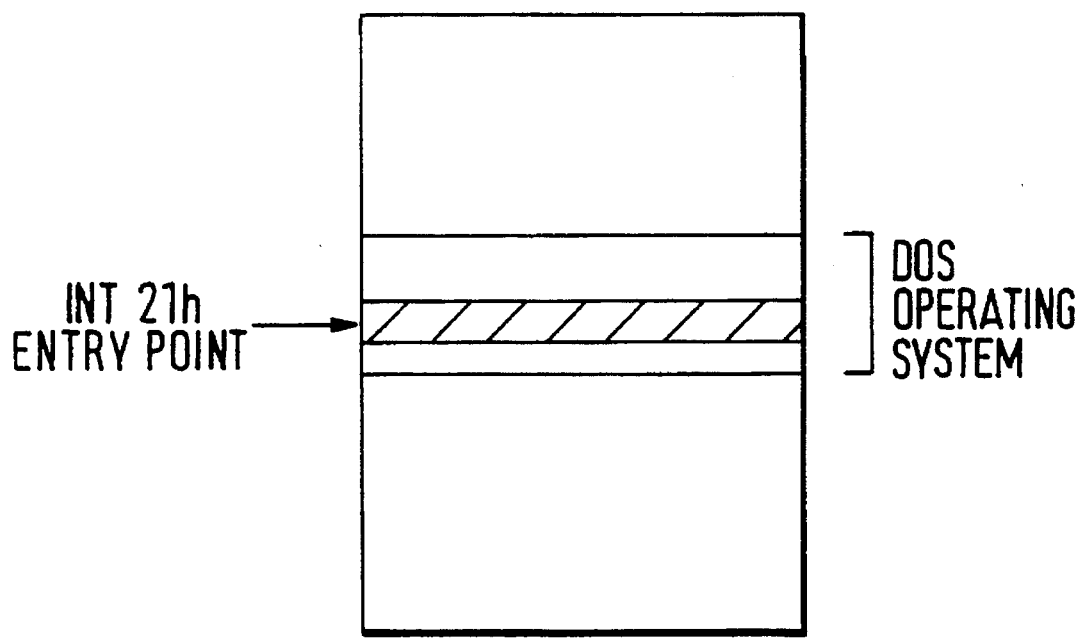
FIG. 7 is a diagram illustrating part of the memory map at the operating system level of a conventional personal computer.
Figure 8:
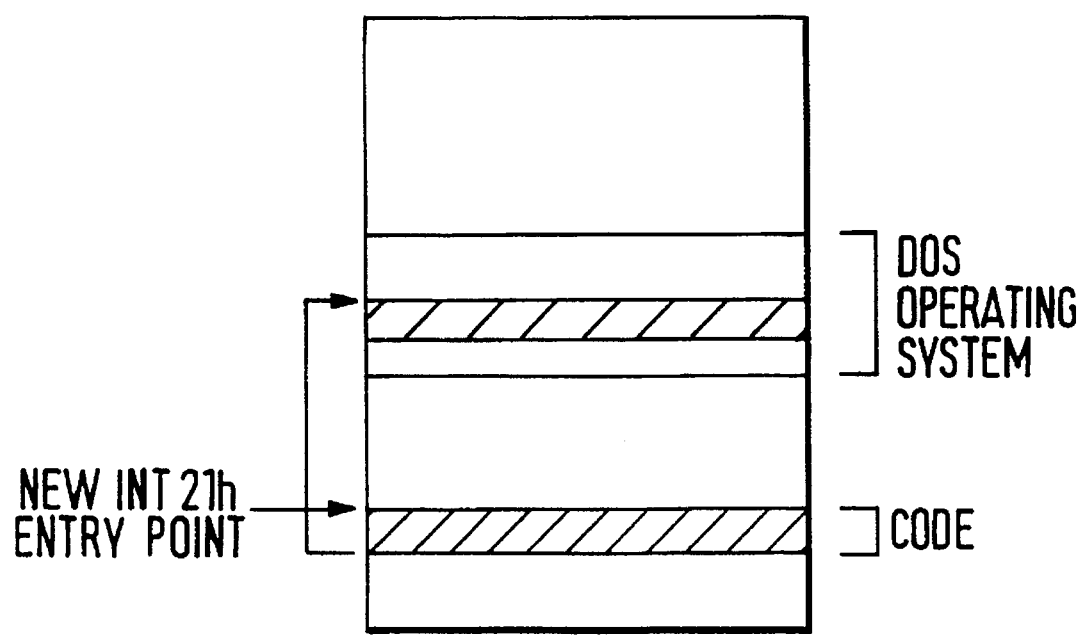
FIG. 8 is a diagram illustrating the corresponding part of the memory map in the method of the invention.

The routines of FIGS. 3 and 6 require disc accesses to be intercepted. How this is achieved will be described with reference to FIGS. 7 and 8. Whenever a program wishes to access a file it calls a standard routine which writes data to the disk. This routine, which in the case of the DOS operating system is known as Interrupt 21 hex function (INT21h), is an integral part of the operating system. Disk read is INT21h Function 3Fh, and disk write is INT21h Function 40h. The action performed by the routine depends on the parameters passed to the routine upon entry. This routine is shown in FIG. 7 as INT21h forming part of the operating system in a system memory map, the INT21h entry point being shown by an arrow. To carry out a preferred method in accordance with the invention, additional program code is added at the operating system interface level as shown in FIG. 8. In practice, in a DOS environment, this can be loaded into the computer as a device driver using the CONFIG.SYS file.

The added software has the effect of an instruction to write data being replaced or supplemented by an alternative set of instructions.

With other operating systems it is likewise necessary to interrupt the file write function in an analogous manner. The skilled programmer will be able to prepare the necessary routines following the above description concerning the DOS operating system.

More generally, the invention may be implemented in many modified methods and other methods and systems other than those described and illustrated.

In particular, the method and system may be combined with the partial file backup system of my aforementioned application Ser. No. 08/165,382. When this is done, the same auxiliary database can be used to note modifications to the data as is used in accordance with the present invention to note accesses to the data. The only difference is that it becomes necessary to record in the auxiliary database whether the access was a read access or a write access. The partial file backup system of my earlier application then responds to entries concerning write accesses to the auxiliary database, while the partial file HSM system of the present application takes account of both read and write accesses.

In another modification, the system is extended by, in effect, increasing the inactivity threshold to the lifetime of the auxiliary database. That is to say, in FIG. 5, step 44 is modified so that instead of distinguishing blocks that have or have not been accessed since a specified date, it distinguishes blocks that have or have not been accessed at all, that is since the auxiliary database was first created or filled. In this case the auxiliary database no longer needs to record the date or date/time of each access.

There may be circumstances in which it is not desired to migrate certain file portions, even though they have not been accessed. This may apply to the first and possibly the last block in each file, for example.

Finally, if the invention is to be embodied in a completely new operating system, then the auxiliary database could, in principle, be combined with the file allocation table (FAT). However it will normally be preferred to keep the two separate.

I claim:

1. A method of accessing data stored in a computer system that includes a random access memory, a central processing unit, and mass storage means, the method comprising the steps of:

providing instructions stored in said random access memory to said central processing unit to cause said processing unit to seek to access data stored in said mass storage means by generating a write request or a read request; said central processing unit commanding the following operations:

identifying a file to which access is required;

identifying from said write request or read request file portion locations in said file to which access is necessary;

building an auxiliary database which identifies said file portion locations to which access is to be made and the date or date/time at which access is made; and accessing said file portions.

2. A method as claimed in claim 1, in which said computer system comprises a file allocation table which defines the locations of file portions on said mass storage means, the method further comprising the step of checking said file allocation table to determine whether said file portions are on said mass storage device.

3. A method as claimed in claim 2, in which said computer system comprises secondary storage means for storing archived files, the method further comprising, when said checking step determines that said file portions are not on said mass storage device, the step of retrieving said file portions from said secondary storage means.

4. A method as claimed in claim 2, in which said file portions are blocks corresponding to the elemental blocks identified in said file allocation table.

5. A method as claimed in claim 1, in which said auxiliary database further defines whether said access is a write access or a read access.

6. A method of archiving data stored in a computer system that includes a random access memory, a central processing unit, mass storage means, and secondary storage means, the method comprising the steps of:

providing instructions stored in said random access memory to said central processing unit to cause said central processing unit to archive selected data stored in said mass storage means onto said secondary storage means to release space on said mass storage means; said central processing unit commanding the following operations:

providing in relation to a file to be archived an auxiliary database which identifies file portion locations in said file to which access has been made and the date or date/time at which accesses were made;

identifying from said auxiliary database file portion locations that have been accessed since a specified date and file portion locations that have not been accessed since said specified date;

archiving to said secondary storage means at least some file portions identified in said auxiliary database by file portion locations that have not been accessed since said specified date; and deleting from said mass storage means file portions that have not been accessed since said specified date, while retaining on said mass storage means file portions that have been accessed since said specified date.

7. A method as claimed in claim 6, in which said archiving and deleting steps comprise archiving and deleting those file portions that have not been accessed since said specified date and have already been backed up a predetermined number of times.

8. A method as claimed in claim 6, in which said computer system comprises a file allocation table which defines the locations of file portions on said mass storage means, and in which the deleting step comprises amending said file allocation table.

9. A method as claimed in claim 8, in which said file portions are blocks corresponding to the elemental blocks identified in said file allocation table.

10. A method of accessing data stored in a computer system that includes a random access memory, a central processing unit, and mass storage means, the method comprising the steps of:

providing instructions stored in said random access memory to said central processing unit to cause said processing unit to seek to access data stored in said mass storage means by generating a read request; said central processing unit commanding the following operations:

identifying a file to which read access is required;

identifying file portions in said file to which access is necessary;

building an auxiliary database which identifies said file portions to which access is to be made by at least file portion location, and not including the file portion itself; and accessing said file portions.

11. A method as claimed in claim 10, in which said computer system comprises a file allocation table which defines the locations of file portions on said mass storage means, the method further comprising the step of checking said file allocation table to determine whether said file portions are on said mass storage device.

12. A method as claimed in claim 11, in which said computer system comprises secondary storage means for storing archived files, the method further comprising, when said checking step determines that said file portions are not on said mass storage device, the step of retrieving said file portions from said secondary storage means.

13. A method as claimed in claim 11, in which said file portions are blocks corresponding to the elemental blocks identified in said file allocation table.

14. A method of archiving data stored in a computer system that includes a random access memory, a central processing unit, mass storage means, and secondary storage means, the method comprising the steps of:

providing instructions stored in said random access memory to said central processing unit to cause said central processing unit to archive selected data stored in said mass storage means onto said secondary storage means to release space on said mass storage means; said central processing unit commanding the following operations:

providing in relation to a file to be archived an auxiliary database which identifies file portion locations in said file to which access has been made;

identifying from said auxiliary database file portion locations that have been accessed;

archiving to said secondary storage means at least some file portions that have not been accessed; and deleting from said mass storage means file portions that have not been accessed, while retaining on said mass storage means file portions that have been accessed.

15. A method as claimed in claim 14, in which said archiving and deleting steps comprise archiving and deleting those file portions that have not been accessed and have already been backed up a predetermined number of times.

16. A method as claimed in claim 14, in which said computer system comprises a file allocation table which defines the locations of file portions on said mass storage means, and in which the deleting step comprises amending said file allocation table.

17. A method as claimed in claim 16, in which said file portions are blocks corresponding to the elemental blocks identified in said file allocation table.

18. In a computer system that includes a random access memory, a central processing unit, and mass storage means, apparatus for accessing data stored in said computer system, said apparatus comprising:

means for providing instructions stored in said random access memory to said central processing unit to cause said processing unit to seek to access data stored in said mass storage means by generating a write request or a read request;

means for identifying a file to which access is required;

means for identifying file portion locations in said file to which access is necessary;

means for building an auxiliary database which identifies said file portion locations to which access is to be made and the date or date/time at which access is made; and means for accessing said file portions.

19. The apparatus as claimed in claim 18, in which said computer system comprises a file allocation table which defines the locations of file portions on said mass storage means, the apparatus further comprising means for checking said file allocation table to determine whether said file portions are on said mass storage device.

20. The apparatus as claimed in claim 19, in which said computer system comprises secondary storage means for storing archived files, and means for retrieving said file portions from said secondary storage means when said checking step determines that said file portions are not on said mass storage device.

21. The apparatus as claimed in claim 19, in which said file portions are blocks corresponding to the elemental blocks identified in said file allocation table.

22. The apparatus as claimed in claim 18, in which said auxiliary database further defines whether said access is a write access or a read access.

23. In a computer system that includes a random access memory, a central processing unit, mass storage means, and secondary storage means, apparatus for archiving data stored in said computer system, said apparatus comprising:

means for providing instructions stored in said random access memory to said central processing unit to cause said central processing unit to archive selected data stored in said mass storage means onto said secondary storage means to release space on said mass storage means;

means for providing in relation to a file to be archived an auxiliary database which identifies file portion locations in said file to which access has been made and the date or date/time at which accesses was made;

means for identifying from said auxiliary database file portion locations that have been accessed since a specified date and file portion locations that have not been accessed since said specified date;

means for archiving to said secondary storage means at least some file portions that have not been accessed since said specified date; and means for deleting from said mass storage means file portions that have not been accessed since said specified date, while retaining on said mass storage means file portions that have been accessed since said specified date.

24. The apparatus as claimed in claim 23, in which said archiving means and said deleting means comprise means for archiving and deleting those file portions that have not been accessed since said specified date and have already been backed up a predetermined number of times.

25. The apparatus as claimed in claim 23, in which said computer system comprises a file allocation table which defines the locations of file portions on said mass storage means, and in which the deleting means comprises means for amending said file allocation table.

26. The apparatus as claimed in claim 25, in which said file portions are blocks corresponding to the elemental blocks identified in said file allocation table.

27. In a computer system that includes a random access memory, a central processing unit, and mass storage means, apparatus for archiving data stored in said computer system, said apparatus comprising:

means for providing instructions stored in said random access memory to said central processing unit to cause said processing unit to seek to access data stored in said mass storage means by generating a read request;

means for identifying a file to which read access is required;

means for identifying file portion locations in said file to which access is necessary;

means for building an auxiliary database which identifies said file portion locations to which access is to be made; and means for accessing said file portions.

28. The apparatus as claimed in claim 27, in which said computer system comprises a file allocation table which defines the locations of file portions on said mass storage means, the apparatus further comprising means for checking said file allocation table to determine whether said file portions are on said mass storage device.

29. The apparatus as claimed in claim 28, in which said computer system comprises secondary storage means for storing archived files, and means for retrieving said file portions from said secondary storage means when said checking step determines that said file portions are not on said mass storage device.

30. The apparatus as claimed in claim 28, in which said file portions are blocks corresponding to the elemental blocks identified in said file allocation table.

31. In a computer system that includes a random access memory, a central processing unit, mass storage means, and secondary storage means, apparatus for archiving data stored in said computer system, said apparatus comprising:

means for providing instructions stored in said random access memory to said central processing unit to cause said central processing unit to archive selected data stored in said mass storage means onto said secondary storage means to release space on said mass storage means;

means for providing in relation to a file to be archived an auxiliary database which identifies file portion locations in said file to which access has been made;

means for identifying from said auxiliary database file portion locations that have been accessed;

means for archiving to said secondary storage means at least some file portions that have not been accessed; and means for deleting from said mass storage means file portions that have not been accessed, while retaining on said mass storage means file portions that have been accessed.

32. The apparatus as claimed in claim 31, in which said archiving and deleting means comprise means for archiving and deleting those file portions that have not been accessed and have already been backed up a predetermined number of times.

33. The apparatus as claimed in claim 31, in which said computer system comprises a file allocation table which defines the locations of file portions on said mass storage means, and in which the deleting means comprises means for amending said file allocation table.

34. The apparatus as claimed in claim 33, in which said file portions are blocks corresponding to the elemental blocks identified in said file allocation table.

\* \* \* \* \*